July 27, 1965 A. HEY 3,196,593
MANUFACTURE AND FILLING OF CONTAINERS
Original Filed Nov. 10, 1960 3 Sheets-Sheet 2

INVENTOR.
ARIE HEY
BY
his ATTORNEYS

July 27, 1965  A. HEY  3,196,593
MANUFACTURE AND FILLING OF CONTAINERS
Original Filed Nov. 10, 1960  3 Sheets-Sheet 3

INVENTOR.
ARIE HEY
BY
his   ATTORNEYS

United States Patent Office 3,196,593
Patented July 27, 1965

3,196,593
MANUFACTURE AND FILLING OF CONTAINERS
Arie Hey, Etten, North Brabant, Netherlands, assignor to Lever Brothers Company, New York, N.Y., a corporation of Maine
Original application Nov. 10, 1960, Ser. No. 68,564. Divided and this application June 18, 1964, Ser. No. 376,194
8 Claims. (Cl. 53—140)

This application is a division of my copending application Serial No. 68,564 filed on November 10, 1960 for "Manufacture and Filling of Containers."

The invention relates to the manufacture and filling of containers, and in particular to the manufacture and filling of containers made from thermoplastic material.

It is an object of the present invention to provide a method and apparatus for producing closed filled containers in a continuous cycle of operations.

According to the invention there is provided a method of producing closed filled containers which comprises forming an open container by injection-moulding, filling the substance to be packed into the container with a separate cover while the container is still in the mould and discharging the filled and closed container from the mould.

In order that decomposition products, released during the moulding operation, do not remain in the container, the latter can be rinsed with an inert gas prior to the filling operation.

Preferably the cover is heat-sealed to the container while the latter is still in the mould.

The substance to be packed may be a liquid, paste or powder.

In case the invention is applied to packaging foodstuffs, these are preferably sterilised and the container is closed by a sterilised cover. In order that decomposition products originating from the sterilising process of the covers are not enclosed with the foodstuffs, the space in the cavity of the mould above the level of the substance filled into the container may be rinsed with an inert gas during the application of the cover to the container. If the foodstuff is sterilised, the inert gas is preferably also sterilised.

The invention also relates to an apparatus for producing closed filled containers comprising an injection mould which comprises a stationary supply plate and a movable cavity plate provided with at least four cavities, each having a sprue and runner, and arranged for step-by-step movement for moving each cavity successively to an injection station, a filling station, a closing station and a discharge station.

Preferably the cavities are arranged on a circle and are rotatable around a vertical axis through the centre of the circle. With this arrangement the mould may have four cavities spaced in equidistant relationship and arranged for intermittent rotation through 90° around the vertical axis.

According to a preferred embodiment, the supply plate is provided wtih a core, a tool for applying a cover to a container, and a bore connected with the supply pipe for the substance to be packed, which core and tool can each register simultaneously with different cavities when the mouth of the bore is over an intermediate cavity. In such an arrangement the core and the tool can register with two cavities arranged diametrically opposite each other. A second bore connected to a supply pipe for an inert gas can be arranged in the supply plate adjacent to the bore through which the substance to be packed can be supplied.

The tool for applying a cover to a container can be provided with a bore connected to a second supply pipe for an inert gas. The tool for applying a cover to a container can be arranged for heat-sealing the cover to the container.

In order that after its formation each container is absolutely sterile, the mould can be provided with heating elements for maintaining the thermoplastic material in the runners and in the sprues in a plastic state at a temperature above the sterilisation temperature.

Should the moulding step, due to the cooling time necessary, require more time than the filling and closing steps, the moulding step can be arranged so that cooling takes place over a greater sector of the circle than the other steps. In that case the mould is provided with more than four cavities, for example eight. At the first station the mould would be closed; at the second the thermoplastic material would be injected into the mould; at the third to fifth the container would be allowed to cool or be cooled by external means, the removal of the core also taking place at the fifth station; which stations are then followed by filling, application of cover and sealing of the cover on to the container, and ejection of the closed, filled container. In such an arrangement a number of cores equal to the number of cavities must be provided, each core being able to move in unison with a co-operating cavity over part of its track when lowered into said cavity. This requirement can be met by having a plurality of cores equal in number to that of the cavities, said cores being carried by a core carrier situated above the supply plate and movable in unison with the cavity plate, the supply plate being provided with an arcuated slot through which each core can be moved into and out of its co-operating cavity by said core carrier.

Suitable materials for the container are polystyrene, unplasticised polyvinylchloride, polyethylene, polypropylene and polyamides.

The invention will now be described with reference to the accompanying drawing, in which.

Figure 1:
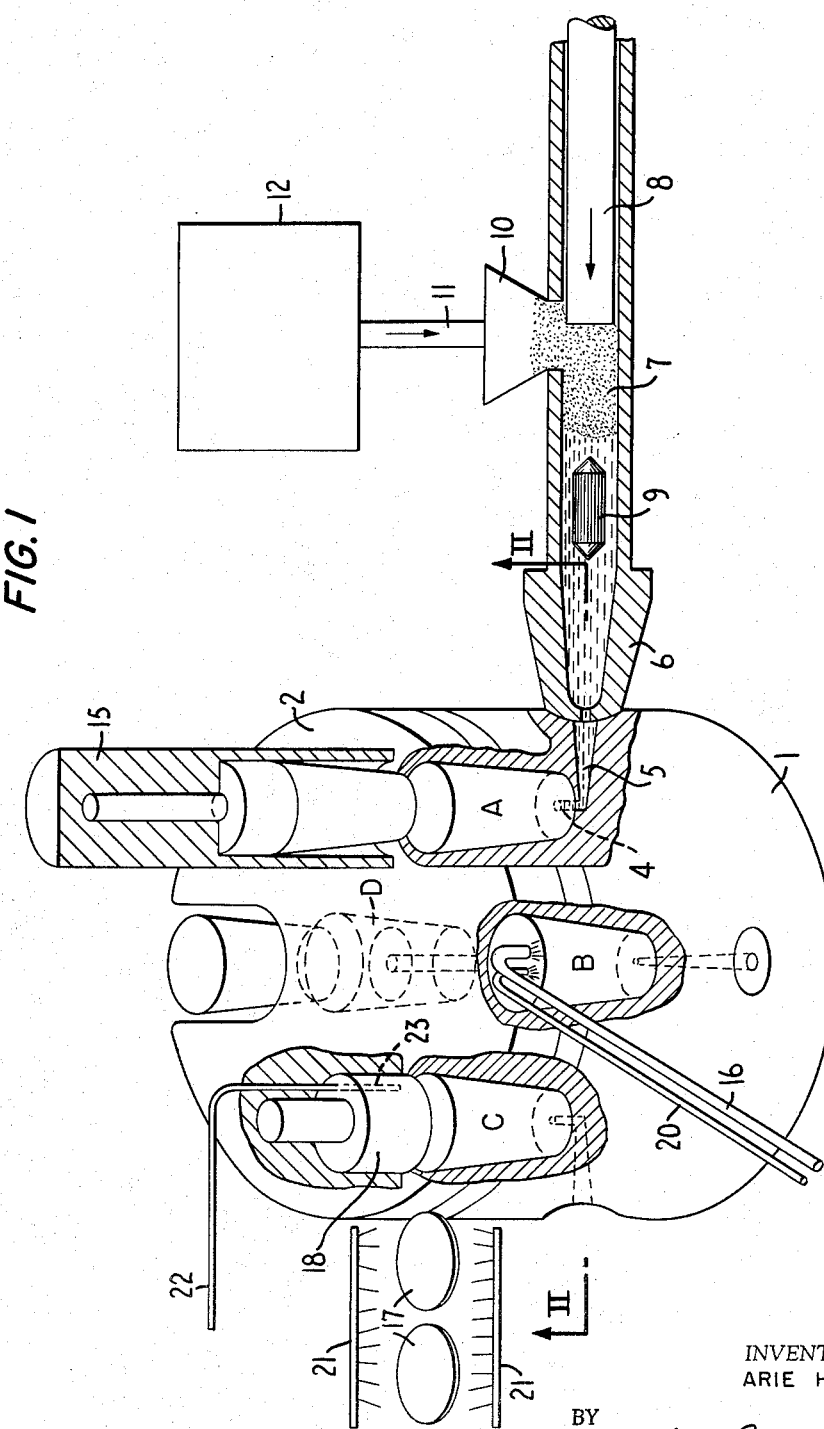
FIG. 1 is a schematic isometric view, partly in section.

Referring to FIG. 1, a mould for carrying out the invention consists basically of a cavity plate 1 and a supply plate 2. The cavity plate 1 is circular in plan and is arranged for step-by-step rotation around its vertical axis. In the cavity plate shown four identical cavities 3 are arranged, each provided with its own runner 4 and sprue 5. On rotation of plate 1, the nozzle 6 of an injection press can successively register with each of the sprues 5.

In FIG. 1, 7 indicates the heating chamber, 8 the ram, 9 the spreader and 10 the hopper of an injection-press. Hopper 10 is supplied through feed chute 11 with thermoplastic material from a container 12.

Figure 2:
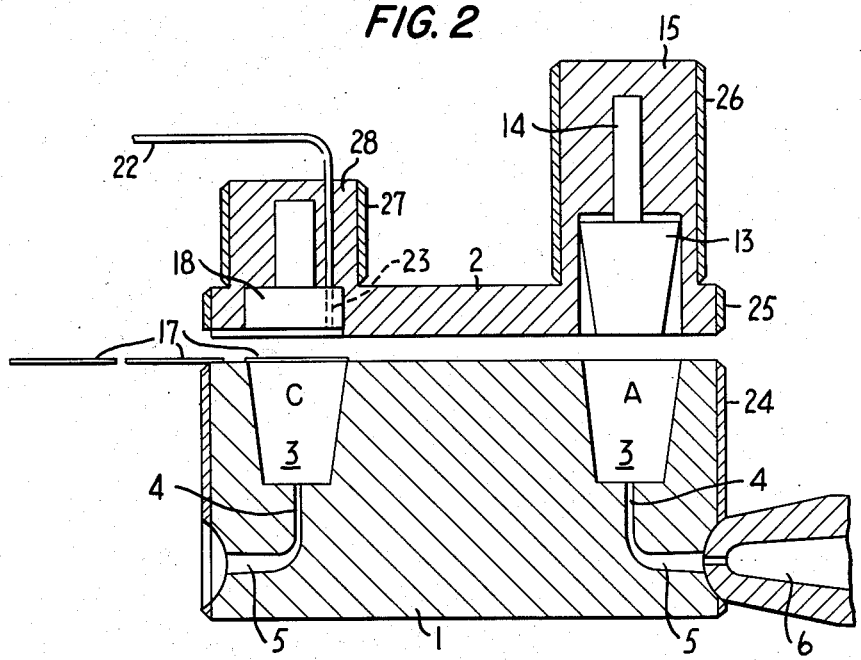
FIG. 2 is a portion of a vertical section along line II—II of FIG. 1.
Figure 5:
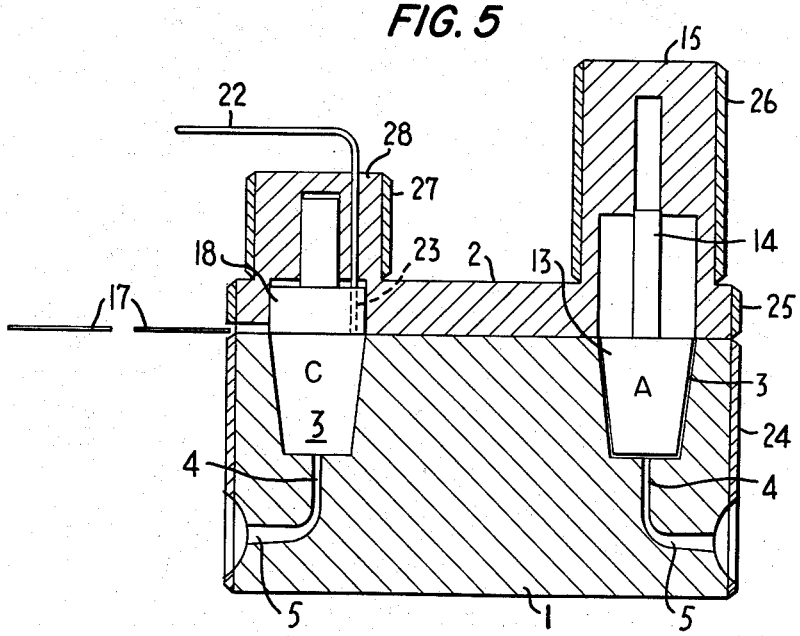
FIG. 5 is a section corresponding with FIG. 2 and showing the mould in a closed position.

Every time nozzle 6 registers with a sprue 5, ram 8 carries out an injection stroke whereby the desired amount of thermoplastic material is injected in a cavity 3. During this operation, supply plate 2 is pressed by pressing means (not shown) against the top-surface of cavity plate 1, and a core 13, which is slidably guided by a guide pin 14 in part 15 integral with plate 2, is located in a cavity 3 positioned at A (FIG. 5). When the material injected has sufficiently set, core 13 is retracted into the position shown in FIGS. 1 and 2, and the supply plate 2 is slightly lifted by lifting means (not shown) from plate 1, after which cavity plate 1 is rotated through an angle of 90°, so that the cavity in position A is moved into position B and the subsequent cavity 3 is moved into register with nozzle 6. A new injection-cycle can begin when plate 2 is again pressed against plate 1 and when core 13 has been lowered into the cavity at position A.

Figure 3:
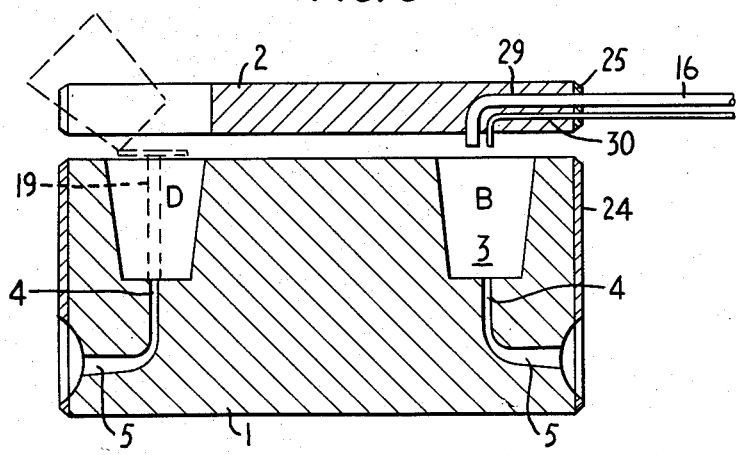
FIG. 3 is a similar section at right angles to the section of FIG. 2.
Figure 4:
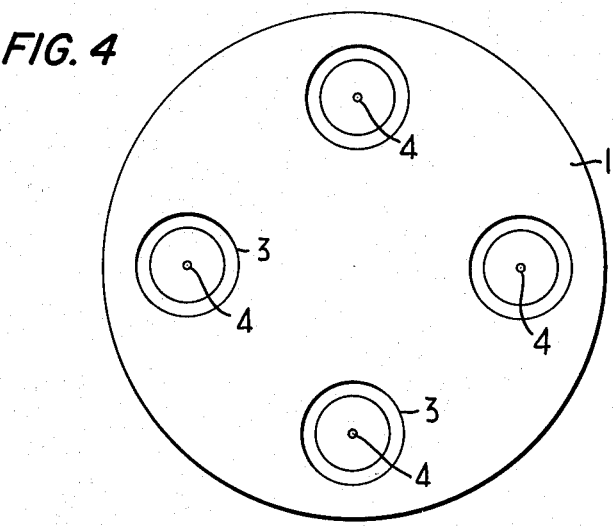
FIG. 4 is a plan view of the cavity plate.

During this new injection-cycle the container in position B is filled with the substance to be filled, supplied by pipe 16. Pipe 16 is connected to a bore 29 (FIG. 3) arranged in supply plate 2 and opening over a cavity at position B. Subsequently the cavity plate is rotated again over an angle of 90°, so that a third cavity 3 is moved into register with nozzle 6, a newly formed container is moved into position B and the filled container is moved from position B into position C. In this position C, a cover 17, supplied by transport means (not shown), is applied to the filled container. After the mould has been closed for the next injection-cycle, a tool 18, slidably mounted in part 28 of supply plate 2, is moved in a downward direction for firmly applying the cover to the container. In the meantime a new container has been formed in position A and the container in position B has been filled.

After core 13 and the tool 18 have been retracted and supply plate 2 lifted through a small distance, cavity plate 1 is rotated again through an angle of 90°, so that the filled and closed container is moved from position C to position D. In this position D the filled container is discharged from the mould by means of an ejector pin 19. Meanwhile the same operations as already described are effected at the positions A, B and C. With the next cycle the empty cavity in position D is again brought into register with nozzle 6, after which the same steps are repeated. It will be apparent from the above that with every quarter of a revolution of cavity plate 1, a closed and filled container is delivered from the mould.

In case the thermoplastic material used for forming the containers has a tendency to produce obnoxious vapours or decomposition products at the moulding temperature, a pipe 20 connected to a bore 30 in supply plate 2 and adjacent to bore 29 may be arranged for supplying an inert gas to rinse the container at position B prior to the filling operation.

When the invention is applied for packaging sterilised foodstuffs, it is not necessary to submit the formed containers to a sterilising process, since they are already sterilised at the moulding temperature. In that case the container at position B, prior to filling with a sterilised foodstuff, may be rinsed by a sterilised inert gas supplied by pipe 20. For sterilising the covers before their application to a container, heating elements, schematically shown at 21 in FIG. 1, may be provided. In order to discharge obnoxious vapours or decomposition products, which might result from the sterilisation of the covers, a pipe 22 for supplying a sterilised inert gas may be connected to a bore 23 in tool 18. In this manner the space in the mould above the level of the substance in the container at position C can be rinsed before the container is closed.

Tool 18 may be arranged for heat-sealing the covers to the containers so that hermetically closed packs are obtained.

The method described may also be applied with the so-called hot-sprue process. In that case each sprue is provided around its periphery with heating elements, which keep the material in the sprues in a liquid state.

For sterilising the mould, it may also be necessary to provide the cavity plate 1 and the supply plate 2 with heating elements 24 and 25 respectively at their periphery and with heating elements 26 and 27 around the parts 15 and 28 of the core plate, in which parts the core 13 and the tool 18 are retracted prior to rotation of the cavity plate 1.

I claim:

1. An apparatus for producing closed filled containers comprising a cavity plate having a mould cavity therein, a supply plate adjacent to and overlying said cavity plate, a core member movable relative to said supply and cavity plates for movement into and out of said cavity, means for injecting a molten plastic into said cavity when said core member is in said cavity to form a container, means on said supply plate for introducing a filling material into said container, means on said supply plate for applying a cover to said container after the latter is filled, means in said cavity plate for ejecting the filled, covered container from said cavity and means for moving said cavity plate, supply plate and core member relatively to form, fill, cover and eject said container.

2. The apparatus set forth in claim 1 in which said means for introducing filling material comprises a bore in said supply plate connected with a source of said filling material.

3. The apparatus set forth in claim 1 comprising a plurality of mould cavities in said cavity plate and a corresponding number of cores for said cavities movable relative to said supply plate and into and out of said mould cavities.

4. The apparatus set forth in claim 1 comprising a passage for introducing inert gas into said container adjacent to the means for introducing filling material into said container.

5. The apparatus set forth in claim 1 in which the means for applying a cover to said container comprises means for heat sealing said cover to said container.

6. The apparatus set forth in claim 1 comprising means for supplying inert gas to said container adjacent to said means for applying a cover.

7. The apparatus set forth in claim 1 comprising a sprue and a runner in said cavity plate through which said plastic material is injected into said mould, and means for heating said sprue and runner.

8. The apparatus set forth in claim 1 comprising means for heating said cavity plate to maintain the mould cavity at sterilisation temperature.

No references cited.

FRANK E. BAILEY, *Primary Examiner.*